Patented Mar. 10, 1953

2,631,137

UNITED STATES PATENT OFFICE 2,631,137

THIXOTROPIC COMPOSITIONS

John A. Loritsch, Scotia, and Murray Berdick, New York, N. Y., assignors to General Electric Company, a corporation of New York No Drawing. Application December 31, 1949, Serial No. 136,412

9 Claims. (Cl. 260—40)

This invention relates to thixotropic compositions, and more particularly to polymerizable thixotropic coating and filling compositions comprising a polymerizable liquid and a filler.

A problem of long standing encountered in factory practice in connection with the use of conventional varnishes for coating or filling applications is the excessive drainage from the coated or filled part after the varnish has been applied. A portion of this drainage occurs at room temperature immediately after the part has been removed from the treating tank because of the fluid nature of the conventional varnishes generally employed. This drainage continues until sufficient solvent has evaporated to cause the viscosity of the varnish on the surface or in the interstices of the treated object to become sufficiently high to enable it to remain in position. It is obvious that the nature of the process is such that too much of the varnish drains away from the top of the treated part and a surplus collects at the bottom of the part, resulting in a very uneven and undesirable ultimate distribution of the varnish base throughout the part. Further drainage occurs during the early stages of any baking process which might be involved, when the varnish base remaining in the treated part becomes increasingly fluid as the temperature is increased. This drainage will continue until the temperature is sufficiently high, and has been applied sufficiently long to cause the varnish to thicken or "skin over" due to polymerization reactions of one type or another, such as condensation, oxidation and addition reactions. Conventional varnishes also have a disadvantage in that they draw away from sharp corners and edges, leaving these regions practically bare.

The net result of methods of coating and filling in such a manner is a very uneconomical utilization of the weight of varnish originally applied, only a fraction being retained. Furthermore, an undesirably uneven distribution of the varnish in the interstices and on the surface of the treated part results.

Where the problem of coating or filling electrical devices, such as for example, electrical coils, has been involved, the amount of material retained after a single application is in most cases insufficient to afford a structure having the required electrical and mechanical properties. Several successive applications and curings are usually necessary, adding considerably to the cost of the treatment. In the case of open structures, such as electrical coils, a complete filling becomes impossible employing the coating and filling compositions heretofore known in the art, not only because of the fact that the inert, volatile solvent in the composition must be expelled after each application, but also because many voids are sealed off during the evaporation of the solvents. In many cases these voids cannot be filled by additional varnish regardless of how many subsequent treatments are applied to the structure. This causes the treated structure to have an unequal thermal conductivity from one part to another as well as a much lower overall heat dissipation rate as compared with a completely void-free structure. In high voltage equipment the presence of voids in the insulation also gives rise to internal corona discharge with resulting deterioration of the insulation.

Certain of the above difficulties can be eliminated by the use of so-called solventless varnishes. This term is intended in the present disclosure to cover compositions of matter which are polymerizable fluids substantially free of inert, volatile solvents such as those used in conventional varnishes, and which, by the incorporation of suitable catalysts, may be caused to polymerize to form substantially infusible and insoluble materials without the necessity of taking up oxygen from the air and without forming volatile products.

Since the conversion from the fluid to the hard, infusible stage occurs with little or no loss of the weight of material applied in the coating or filling operation, it is possible, by the use of proper vacuum-pressure impregnating technique, not only to fill completely all the spaces in an open structure, such as a coil, but also to maintain this condition subsequently during the curing operation, provided that substantially no drainage of varnish occurs during the baking process.

Many of the solventless varnishes of the type with which the present invention is concerned, and which will be hereinafter more fully described, comprise fairly fluid, non-volatile compositions. Therefore, in comparison with the conventional varnishes containing highly viscous or solid bases, these solventless varnish compositions suffer the disadvantage that they do not become increasingly viscous on standing at room temperature by the evaporation of a volatile inert solvent. As a result an open structure coated or filled with such a solventless varnish composition will continuously suffer loss of varnish by drainage after it has been withdrawn from the treating tank and before it has been polymerized by heating. Furthermore, in common with the conventional varnishes containing appreciable amounts of solvents, many of the solventless varnishes have the disadvantage that during the early stages of the curing process their viscosity is substantially reduced, further aggravating the drainage problem. The difficulties arising out of this property of the solventless varnishes in many cases have proved to be serious enough to offset the principal advantage in using the solventless varnishes for the filling of open structures.

It is an object of the present invention to provide liquid coating and filling compositions which will not drain from an object prior to and during curing.

Another object of this invention is to provide coating and filling compositions which may be applied and cured without loss of the composition.

A further object of the present invention is to provide coating and filling compositions which when applied to objects will remain in situ before and during curing even on corners and edges.

It has been discovered that the advantages in the use of solventless varnishes may be realized in coating and filling operations and at the same time the disadvantage of excessive drainage may be avoided by employing the compositions of this invention. These compositions may be converted by means of heat to an infusible and insoluble state and are suitable in general for coating and filling operations and particularly for the insulation of electrical equipment. After a coating of one of the present compositions has been applied to a part, little or no drainage of the composition from the part occurs, either at room temperature or at the elevated temperatures required for complete conversion of the composition to the infusible and insoluble state. The unusual combination of properties characterizing these compositions rests in the discovery that suitable quantities of certain specific fillers, in combination with solventless varnishes or polymerizable liquids, form compositions which are fluid as long as they are kept in an agitated condition but solidify shortly after agitation has ceased and will not flow either at room temperature or at temperatures up to about 150° C. unless mechanically disturbed before they have hardened by polymerization.

While it is well-known that the incorporation of fillers into a varnish will reduce the flow of the resulting mixture by reason of increased viscosity, this general property is not relied upon for the properties of the present compositions. The specific fillers which are here employed with solventless varnishes form thixotropic compositions capable of undergoing isothermal, reversible, sol-gel transformations, a fluid sol condition existing as long as the mixture is agitated, the sol reverting into a gel within a very short time after agitation has ceased. However, upon heating the gel it polymerizes into an infusible product which is no longer capable of reversion to the fluid sol state. The system may be simply expressed by the following relationship:

$$\text{Fluid sol} \underset{\text{Upon Agitation}}{\overset{\text{at rest}}{\rightleftarrows}} \text{Gel-like solid} \overset{\Delta}{\longrightarrow} \text{Polymerized Product}$$

The term "thixotropy" is used herein to denote the property of a fluid filler-liquid composition of reverting rapidly on standing into a gel-like mass having sufficient cohesive strength to withstand distortion by gravitational force when suspended freely as in an inverted receptacle or on a coated object. The gel is also of such a nature that it can be fluidized by the application of mechanical agitation as by shaking, stirring, vibrating etc. The property of thixotropy as understood herein is thus characterized by a reversible isothermal sol⇌gel transition.

Among the compositions referred to above as solventless varnishes which are employed in combination with specific fillers to form the thixotropic composition of this invention are polymerizable fluids comprising an unsaturated alkyd resin. These liquid unsaturated alkyd resins are the reaction products of polyhydric alcohols, mixtures of polyhydric alcohols or mixtures of polyhydric and monohydric alcohols, and an alpha unsaturated alpha, beta polycarboxylic acid or a plurality of polycarboxylic acids, one of which, at least, is unsaturated polycarboxylic acid, the resinous material having an acid value of up to 60 and preferably between 45 and 60. Examples of such polyhydric alcohols are ethylene glycol, di- and triethylene glycols, propylene glycol, trimethylene glycol, tetramethyl glycol, pentamethylene glycol, glycerine or pentaerythritol in combination with a monohydric alcohol etc. Examples of unsaturated polycarboxylic acids are maleic, fumaric and itaconic acids. Anhydrides of polycarboxylic acids may also be employed. The term "polycarboxylic acid" as used herein is intended to include within its meaning the anhydrides of such acids. In addition to one or more of the unsaturated polycarboxylic acids, saturated polycarboxylic acids may also be present in the reaction mixture in the preparation of the resins referred to above. Examples of such saturated polycarboxylic acids are succinic, adipic, sebacic and phthalic acids.

In addition to the above unsaturated alkyd resins, the polymerizable fluids which are used in the present compositions may contain polymerizable substances such as, for example, esters of unsaturated monohydric alcohols and polycarboxylic acids, including unsaturated polycarboxylic acids, halogenated aromatic polycarboxylic acids and polybasic inorganic acids. Examples of such substances are diallyl phthalate, diallyl succinate, diallyl maleate, diallyl fumarate, diallyl itaconate, diallyl chlorophthalates and triallyl phosphate. Other substances which may be incorporated in these polymerizable liquids are esters of monohydric alcohols and unsaturated polycarboxylic acids which are capable of copolymerizing with unsaturated alkyd resins such as, for example, dioctyl itaconate, dibenzyl itaconate, diethyl fumarate and dibenzyl fumarate.

Esters of acrylic acid and methacrylic acid may also be used as the solventless varnish phase of the present compositions. Examples of such esters are methyl, ethyl, propyl, isopropyl, butyl, isobutyl and allyl methacrylate and methyl, ethyl, propyl, isopropyl, butyl, isobutyl and allyl acrylate.

Vinyl monomers are also capable of being used in the present connection including vinyl benzene, vinyl acteate and combinations thereof among others.

Another solventless varnish which may be utilized herein is the decarboxylated half-ester of glyceryl triricinoleate with an unsaturated alpha beta polycarboxylic acid prepared as disclosed in United States Patent 2,373,527, Agens, assigned to the same assignee as the present invention.

In copending applications Serial Numbers 136,411, 136,412, 136,413, 136,415, 136,416, 136,417, 136,418, all assigned to the same assignee as the present application, there are described various fillers which may be used to render thixotropic certain solventless varnishes of the alkyd and acrylic acid ester type. It has now been found that the above solventless varnishes may be made thixotropic by adding much smaller amounts of filler material than in the above copending applications. It has also been found that certain fillers not described in and which were unsuitable for use in connection with the above-cited copending applications may now be used if the teachings of this invention are followed. It has also been found that certain other solventless varnishes, described herein and not disclosed in the copending applications may be rendered thixotropic by means of the present invention.

Among the effective fillers which will produce thixotropy in the present solventless varnishes are catalpo clay, china clay, diatomaceous earth, flint, titanium dioxide, silica, barytes, mica, talc and tripoli; all being in the ground or powdered state.

It has been found that thixotropy may be easily effected in the present solventless varnish-filler systems by adding to the systems small amounts of other thixotropy inducing agents which are capable of wetting both the resinous and filler components of the solventless varnish-filler systems. In general these fillers may range from about 10 to 80 percent of the total composition. Among such inducing agents are non-ionic polyether surface active agents. The amounts of such surface active agents employed may range, by weight, from about 0.49 (as shown in Example 7, infra) to 6 percent (as shown in Example 2, infra), based on the weight of the polymerizable fluid or polymerizable ingredients in the solventless varnish. Examples of such agents are highly active polar compounds containing polymeric ether groups known commercially as Intral 224, Intral 229 and Intral 384 and manufactured by Synthetic Chemicals, Inc. and hereafter referred to as Compound A. Aryl alkyl polyether alcohols known commercially as Triton E and manufactured by Rohm and Haas are also useful in this respect. These alkyl polyether alcohols will hereafter be referred to as Compound B. Another class of compounds useful for inducing thixotropy in otherwise non-thixotropic solventless varnish filler systems are the polymerized ethylene oxide condensation products having the general formula

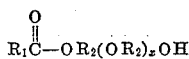

where $R_1$ is a hydrophilic aliphatic chain and $R_2$ is a short hydrocarbon chain which is usually $C_2H_4$. These compounds, made by General Dyestuff Corporation, are known commercially as Igepal CA, Igepal CE and Igepal CTA. These compounds are hereinafter referred to as Compound C.

Certain polyhydric alcohols such as ethylene glycol, diethylene glycol and glycerine and derivatives thereof such as sorbitan monooleate, may also be used as thixotropy inducing agents with certain of the solventless varnishes disclosed herein. Certain of the above polyhydric alcohols require a small addition of water in order that they may impart good thixotropic properties to the varnish-filler systems. It is believed, in those instances in which additional water is not necessary, that the requirement for water is satisfied by the small amount of water normally present in the solventless varnish as manufactured, by absorption on the filler as received or because of the hydroscopic or hydrophilic nature of the inducing agent.

The thixotropic compositions of this invention may be converted into an infusible insoluble state by means of heat alone, for example, by curing parts coated or filled with these compositions at temperatures of from about 80° C. to about 150° C., or more preferably from about 100° C. to about 125° C. However, for practical reasons, it is desirable to incorporate a polymerization catalyst in order to accelerate the polymerization of the coating or filling compositions. Any of the catalysts known to those skilled in the art may be employed. Examples of such catalysts which have been found to be particularly suitable are benzoyl peroxide, tertiary butyl perbenzoate, ditertiary butyl diperphthalate and tertiary butyl hydroperoxide. Any suitable amount of catalyst may be used, but in general the catalyst concentration will be within the range of from about 0.5 to about 2.0 percent by weight of the polymerizable liquid.

The following examples are illustrative of the thixotropic compositions which may be produced according to the present invention. All parts are by weight.

*Example 1*

| | Parts |
|---|---|
| Glyceryl tris (cyclohexyl maleate) | 30.0 |
| Diallyl phthalate | 30.0 |
| Tertiary butyl perbenzoate | 0.6 |
| Catalpo clay | 40.0 |
| Compound A | 1.5 |

When the above ingredients were mixed thoroughly together, a composition having pronounced thixotropic properties resulted. A glass rod dip-coated in the composition and hung in air at room temperature showed no drainage after one hour. Neither was there any drainage after a two hour cure at 125° C.

Example 1 was repeated except that no compound A was included. The composition showed no thixotropic properties and substantially all of the material had drained off a glass rod dip-coated in it after one hour at room temperature. It will thus be seen that the Compound A, a highly active polar compound containing polymeric ether groups, produces definite thixotropy in an otherwise non-thixotropic composition.

*Example 2*

| | Parts |
|---|---|
| Glyceryl tris (cyclohexyl maleate) | 20.0 |
| Diallyl phthalate | 20.0 |
| Vinyl acetate-chloride copolymer | 20.0 |
| Tricresyl phosphate | 9.0 |
| Tertiary butyl perbenzoate | 0.4 |
| Catalpo clay | 14.0 |
| Compound A | 2.4 |

The composition produced by mixing the above ingredients was highly thixotropic. A glass rod was dip-coated in the composition and treated by a three step cure consisting of forty minutes each at 80° C., 100° C. and 125° C. No drainage occurred during the cure.

*Example 3*

| | Parts |
|---|---|
| Decarboxylated castor oil maleate | 14.0 |
| Butyl methacrylate monomer | 26.0 |
| Tertiary butyl perbenzoate | 0.2 |
| Ground flint | 80.0 |
| Compound A | 1.2 |

When the above ingredients, less the Compound A, were mixed thoroughly together a smooth composition resulted which had no thixotropic properties. However, when the Compound A was mixed in, the product took on pronounced thixotropic properties.

*Example 4*

|  | Parts |
|---|---|
| Diallyl phthalate | 35.0 |
| Glyceryl tris (cyclohexyl maleate) | 35.0 |
| Tertiary butyl perbenzoate | 0.7 |
| Catalpo clay | 30.0 |
| Compound C | 4.0 |

When the above materials, with the exception of the Compound B, were mixed together, the product exhibited no thixotropic properties. However, upon mixing in the Compound C, the product became highly thixotropic. As pointed out above, Compound C is a polymerized ethylene oxide condensation product having the general formula

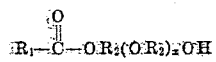

wherein $R_1$ is a hydrophilic aliphatic chain and $R_2$ is a short hydrocarbon chain, usually $C_2H_4$.

*Example 5*

|  | Parts |
|---|---|
| Dicarboxylated castor oil maleate | 24.0 |
| Butyl methacrylate monomer | 48.0 |
| Tertiary butyl perbenzoate | 0.36 |
| Diatomaceous earth | 30.0 |
| Compound A | 0.92 |

When the above ingredients, with the exception of Compound A, were thoroughly mixed together the resulting composition had no thixotropic properties. However, the composition became highly thixotropic when the Compound A was added.

*Example 6*

|  | Parts |
|---|---|
| Diallyl phthalate | 40.0 |
| Glyceryl tris (cyclohexyl maleate) | 40.0 |
| Tertiary butyl perbenzoate | 0.8 |
| Diatomaceous earth | 20.0 |
| Compound A | 0.8 |

While the composition resulting from mixing the above ingredients was not thixotropic until the Compound A was introduced, it then became very highly thixotropic in nature.

*Example 7*

|  | Parts |
|---|---|
| Diallyl phthalate | 36.0 |
| Glyceryl tris (cyclohexyl maleate) | 36.0 |
| Vinyl acetate-chloride copolymer | 15.0 |
| Tricresyl phosphate | 1.3 |
| Tertiary butyl perbenzoate | 0.72 |
| Diatomaceous earth | 15.0 |
| Compound A | 0.35 |

The product produced by mixing the above ingredients was very thixotropic.

*Example 8*

|  | Parts |
|---|---|
| Glyceryl tris (cyclohexyl maleate) | 10.0 |
| Butyl methacrylate monomer | 40.0 |
| Tertiary butyl perbenzoate | 0.25 |
| Catalpo clay | 42.5 |
| Ethylene glycol | 0.5 |

The above ingredients again produced a very thixotropic composition when thoroughly mixed together.

*Example 9*

|  | Parts |
|---|---|
| Glyceryl tris (cyclohexyl maleate) | 10.0 |
| Butyl methacrylate monomer | 40.0 |
| Tertiary butyl perbenzoate | 0.5 |
| Talc | 60.0 |
| Compound A | 0.45 |

The above ingredients when thoroughly mixed together became very thixotropic whereas without the Compound A, no thixotropy was produced.

*Example 10*

|  | Parts |
|---|---|
| Diallyl phthalate | 17.8 |
| Glyceryl tris (cyclohexyl maleate) | 35.7 |
| Vinyl acetate-vinyl chloride copolymer | 19.8 |
| Tricresyl phosphate | 14.8 |
| Tertiary butyl perbenzoate | 0.6 |
| Diatomaceous earth | 9.9 |
| Compound A | 1.4 |

When the above ingredients were mixed thoroughly together, they formed a smooth, homogeneous composition. When a coil was dipped in the material and withdrawn, the build-up of the material on the coil was very substantial. No drainage of material from the coil occurred either on standing at room temperature or on curing at 85° C. for sixteen hours and at 125° C. for five hours. The cured coil was covered with a hard, tough material.

*Example 11*

|  | Parts |
|---|---|
| Diallyl phthalate | 35.0 |
| Glyceryl tris (cyclohexyl maleate) | 35.0 |
| Tertiary butyl perbenzoate | 0.7 |
| Catalpo clay | 30.0 |
| Compound B | 2.5 |

When the above materials, with the exception of Compound B, were mixed thoroughly, no thixotropic properties were evident. However, the composition became quite thixotropic when the Compound B was mixed in.

*Example 12*

|  | Parts |
|---|---|
| Diallyl phthalate | 35.0 |
| Glyceryl tris (cyclohexyl maleate) | 35.0 |
| Tertiary butyl perbenzoate | 0.7 |
| Catalpo clay | 30.0 |
| Glycerin | 2.0 |

When the above materials were mixed thoroughly together, they produced a composition which exhibited pronounced thixotropic properties.

*Example 13*

|  | Parts |
|---|---|
| Diallyl phthalate | 35.0 |
| Glyceryl tris (cyclohexyl maleate) | 35.0 |
| Tertiary butyl perbenzoate | 0.7 |
| Sorbitan monooleate | 2.5 |
| Water | 2.5 |
| Catalpo clay | 30.0 |

When the above materials, with the exception of water, were mixed thoroughly together, the product exhibited very little, if any, thixotropic properties. However, when the water was added, it became highly thixotropic.

Example 14

| | Parts |
|---|---|
| Diallyl phthalate | 35.0 |
| Glyceryl tris (cyclohexyl maleate) | 35.0 |
| Tertiary butyl perbenzoate | 0.7 |
| Catalpo clay | 30.0 |
| Polyethylene glycol (mol wt. 600) | 2.5 |
| Water | 3.0 |

As in the previous example, when the above ingredients, with the exception of water, were thoroughly mixed together, no thixotropy was produced. However, when the water was mixed in, the resultant composition was very thixotropic.

Example 15

| | Parts |
|---|---|
| Diallyl phthalate | 35.0 |
| Glyceryl tris (cyclohexyl maleate) | 35.0 |
| Tertiary butyl perbenzoate | 0.7 |
| Catalpo clay | 30.0 |
| Diethylene glycol | 2.5 |
| Water | 1.5 |

Again it was necessary that the water be mixed in with the above ingredients before a thixotropic composition was produced.

Example 16

| | Parts |
|---|---|
| Diallyl phthalate | 20.0 |
| Diethylene glycol maleate | 20.0 |
| Benzoyl peroxide | 0.4 |
| Silica | 60.0 |
| Compound A | 2.0 |

The above ingredients, when thoroughly mixed together, produced a highly thixotropic composition whereas the composition was not thixotropic when the compound A was omitted.

Example 17

| | Parts |
|---|---|
| Decarboxylated castor oil maleate | 15.0 |
| Styrene | 30.0 |
| China clay | 45.0 |
| Compound A | 0.9 |

The addition of Compound A to the other thoroughly mixed ingredients again produced a highly thixotropic condition.

Example 18

| | Parts |
|---|---|
| Glyceryl tris (cyclohexyl maleate) | 25.0 |
| Styrene | 50.0 |
| Diatomaceous earth | 20.0 |
| Compound A | 1.5 |

Again the above thoroughly mixed ingredients became very thixotropic upon addition of Compound A.

Example 19

| | Parts |
|---|---|
| Butyl methacrylate | 50.0 |
| Talc | 60.0 |
| Compound A | 2.0 |

While the butyl methacrylate and talc did not produce a thixotropic mixture, the addition of Compound A brought about pronounced thixotropic properties.

In order to illustrate the fact that the addition of the present thixotropy inducing agents can cause thixotropy in certain systems at lower filler concentrations than without the agents, the following comparative examples are given:

Example 20

| | Parts |
|---|---|
| Diallyl phthalate | 29.4 |
| Glyceryl tris (cyclohexyl maleate) | 29.4 |
| Catalpo clay | 41.2 |

When the above ingredients were mixed thoroughly together to form a smooth, homogeneous mixture, little or no thixotropic properties were exhibited.

Example 21

| | Parts |
|---|---|
| Diallyl phthalate | 34.6 |
| Glyceryl tris (cyclohexyl maleate) | 34.6 |
| Catalpo clay | 30.8 |

Again the above ingredients produced a non-thixotropic composition when mixed thoroughly together. However, when 1.9 parts of Compound A were added with mixing the composition became highly thixotropic.

From the preceding two examples it will be seen that the addition of thixotropy inducing agents will produce thixotropy in certain systems at substantial lower filler concentrations than without the agent.

To illustrate the significant role of water in producing the thixotropic state, even in those examples where no water was added, the following experiments were carried out:

Example 22

| | Parts |
|---|---|
| Diallyl phthalate | 35.0 |
| Glyceryl tris (cyclohexyl maleate) | 35.0 |
| Catalpo clay | 30.0 |

The above materials did not, when thoroughly mixed, exhibit thixotropic properties. Thixotropy was produced by adding 1.5 parts by weight of Compound A.

When the resinous material and the catalpo clay in the preceding example were dried to remove moisture, the degree of thixotropy induced by the Compound A was less than that in which the materials were used as received with residual moisture. However, by adding 1.5 parts by weight of water along with the Compound A the thixotropic properties were equivalent to those achieved when the material was used as received.

What we claim as new and desire to secure by Letters Patent of the United States is:

1. A thixotropic composition comprising (1) a polymerizable fluid comprising a liquid unsaturated alkyd resin obtained by the reaction between a polyhydric alcohol and an alpha unsaturated alpha, beta polycarboxylic acid, (2) a filler selected from the class consisting of catalpo clay, diatomaceous earth, flint, silica, talc, china clay, titanium dioxide, barytes and tripoli, and (3) from 0.49 to 6 percent, by weight, based on the weight of the polymerizable fluid, of a non-ionic surface active agent capable of wetting both the resinous and filler components and being selected from the class consisting of (a) polymeric ethers and (b) polyhydric alcohols with small amounts of water, the said filler comprising, by weight, from 10 to 80 percent of the total weight of the thixotropic composition.

2. A thixotropic composition comprising (1) a polymerizable fluid comprising (a) a liquid unsaturated alkyd resin obtained by the reaction between a polyhydric alcohol and an alpha unsaturated alpha, beta polycarboxylic acid and (b) an unsaturated monohydric alcohol ester of a polycarboxylic acid, (2) a filler selected from the class consisting of catalpo clay, diatomaceous earth, flint, silica, talc, china clay, titanium dioxide, barytes and tripoli, and (3) from 0.49 to 6 percent, by weight, based on the weight of the polymerizable fluid, of a non-ionic surface active agent capable of wetting both the resinous and filler components and being selected from the class consisting of (a) polymeric ethers and (b) polyhydric alcohols, with small amounts of water, the aforesaid filler comprising, by weight, from 10 to 80 percent of the total weight of the thixotropic composition.

3. A thixotropic composition comprising (1) a polymerizable fluid comprising (a) a liquid unsaturated alkyd resin obtained by the reaction between a polyhydric alcohol and an alpha unsaturated alpha, beta polycarboxylic acid and (b) an ester of a monohydric alcohol and an unsaturated polycarboxylic acid capable of copolymerizing with the unsaturated alkyd resin, (2) a filler selected from the class consisting of catalpo clay, diatomaceous earth, flint, silica, talc, china clay, titanium dioxide, barytes and tripoli, and (3) from 0.49 to 6 percent, by weight, based on the weight of the polymerizable fluid, of a non-ionic surface active agent capable of wetting both the resinous and filler components and being a member selected from the class consisting of (a) polymeric ethers and (b) polyhydric alcohols with small amounts of water, the aforesaid filler comprising, by weight, from 10 to 80 percent, based on the total weight of the thixotropic composition.

4. A thixotropic composition comprising (1) a polymerizable fluid comprising (a) liquid glyceryl tris (cyclohexyl maleate) and (b) diallyl phthalate, (2) a filler comprising a member selected from the class consisting of catalpo clay, diatomaceous earth, flint, silica, talc, china clay, titanium dioxide, barytes and tripoli, and (3) from 0.49 to 6 percent, by weight, based on the weight of the polymerizable fluid, of a non-ionic surface active agent capable of wetting both the resinous and filler components and being selected from the class consisting of (a) polymeric ethers and (b) polyhydric alcohols with small amounts of water, the aforesaid filler comprising, by weight, from 10 to 80 percent, based on the total weight of the thixotropic composition.

5. A thixotropic composition comprising (1) a polymerizable fluid comprising (a) liquid glyceryl tris (cyclohexyl maleate), (b) diallyl phthalate, and (c) a vinyl acetate-vinyl chloride copolymer, (2) a filler comprising diatomaceous earth and (3) from 0.49 to 6 percent, by weight, based on the weight of the polymerizable fluid, of a non-ionic surface active agent capable of wetting both the resinous and filler components and being selected from the class consisting of (a) polymeric ethers and (b) polyhydric alcohols with small amounts of water, the aforesaid diatomaceous earth comprising, by weight, from 10 to 80 percent, based on the total weight of the thixotropic composition.

6. A thixotropic composition comprising (1) a polymerizable fluid comprising (a) a liquid decarboxylated castor oil maleate and (b) butyl methacrylate, (2) a filler comprising diatomaceous earth, and (3) from 0.49 to 6 per cent, by weight, based on the weight of the polymerizable fluid, of a non-ionic surface active agent capable of wetting both the resinous and filler components and being selected from the class consisting of (a) polymeric ethers and (b) polyhydric alcohols with small amounts of water, the aforesaid diatomaceous earth comprising, by weight, from 10 to 80 percent of the total weight of the thixotropic composition.

7. A thixotropic composition comprising (1) a polymerizable fluid comprising (a) diallyl phthalate and (b) liquid diethylene glycol maleate, (2) a filler comprising silica, and (3) from 0.49 to 6 percent, by weight, based on the weight of the polymerizable fluid, of a non-ionic surface active agent capable of wetting both the resinous and filler components and being selected from the class consisting of (a) polymeric ethers and (b) polyhydric alcohols with small amounts of water, the aforesaid silica comprising, by weight, from 10 to 80 percent of the total weight of the thixotropic composition.

8. A thixotropic composition comprising (1) a polymerizable fluid comprising (a) liquid glyceryl tris (cyclohexyl maleate) and (b) styrene, (2) a filler comprising diatomaceous earth, and (3) from 0.49 to 6 percent, by weight, based on the weight of the polymerizable fluid, of a non-ionic surface active agent capable of wetting both the resinous and filler components and being selected from the class consisting of (a) polymeric ethers and (b) polyhydric alcohols with small amounts of water, the aforesaid diatomaceous earth comprising, by weight, from 10 to 80 percent of the total weight of the thixotropic composition.

9. A thixotropic composition comprising (1) a polymerizable fluid comprising (a) a liquid unsaturated alkyd resin obtained by the reaction between a polyhydric alcohol and an alpha unsaturated alpha, beta polycarboxylic acid and (b) an acrylic acid ester, (2) a filler selected from the class consisting of catalpo clay, diatomaceous earth, flint, silica, talc, china clay, titanium dioxide, barytes and tripoli, and (3) from 0.49 to 6 percent, by weight, based on the weight of the polymerizable fluid, of a non-ionic surface active agent capable of wetting both the resinous and filler components and being selected from the class consisting of (a) polymeric ethers and (b) polyhydric alcohols with small amounts of water, the aforesaid filler comprising, by weight, from 10 to 80 percent of the total weight of the thixotropic composition.

JOHN A. LORITSCH.
MURRAY BERDICK.

REFERENCES CITED

The following references are of record in the file of this patent:

UNITED STATES PATENTS

| Number | Name | Date |
|---|---|---|
| 2,220,621 | Ellis | Nov. 5, 1940 |
| 2,443,736 | Kropa | June 22, 1948 |
| 2,482,086 | Foster | Sept. 20, 1949 |

OTHER REFERENCES

"Rheology of Surface Coatings" by Hoagland, published in 1946 by R-B-H Dispersions Inc., Bound Brook, New Jersey, pages 40-43.

"Principles of High Polymer Theory and Practice" by Schmidt et al., published in 1948 by the McGraw-Hill Book Co., page 290. (Copy in the Scientific Library.)

American Ink Maker (article by Fischer) April 1943, pp. 19-23.